United States Patent
Wong

(10) Patent No.: US 10,404,421 B2
(45) Date of Patent: Sep. 3, 2019

(54) TELECOMMUNICATIONS APPARATUS AND METHOD FOR CONVEYING A MESSAGE OVER SELECTED CANDIDATE RADIO RESOURCES IN A SEARCH SPACE

(71) Applicant: SONY CORPORATION, Tokyo (JP)

(72) Inventor: Shin Horng Wong, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/746,114

(22) PCT Filed: Jun. 30, 2016

(86) PCT No.: PCT/EP2016/065308
§ 371 (c)(1),
(2) Date: Jan. 19, 2018

(87) PCT Pub. No.: WO2017/029009
PCT Pub. Date: Feb. 23, 2017

(65) Prior Publication Data
US 2018/0212722 A1    Jul. 26, 2018

(30) Foreign Application Priority Data
Aug. 14, 2015   (EP) .................................... 15181168

(51) Int. Cl.
*H04L 1/18* (2006.01)
*H04W 28/04* (2009.01)
(Continued)

(52) U.S. Cl.
CPC ............ *H04L 1/1893* (2013.01); *H04L 1/189* (2013.01); *H04L 1/1845* (2013.01);
(Continued)

(58) Field of Classification Search
CPC ....... H04L 1/1893; H04L 1/1845; H04L 5/00; H04L 1/189; H04L 1/1874; H04W 28/04; H04W 28/0215
See application file for complete search history.

(56) References Cited

U.S. PATENT DOCUMENTS

| | | | |
|---|---|---|---|
| 9,769,591 B2 * | 9/2017 | Nguyen | H04W 4/70 |
| 2009/0168920 A1 * | 7/2009 | Chen | H04L 1/1835 |
| | | | 375/295 |

(Continued)

FOREIGN PATENT DOCUMENTS

| | | | |
|---|---|---|---|
| EP | 2777204 B1 * | 10/2018 | |
| WO | 2015/113664 A1 | 8/2015 | |

OTHER PUBLICATIONS

"Physical downlink control channel for enhanced coverage MTC UE," Ericsson, 3GPP TSG RAN WG1 Meeting #75, R1-135646, Nov. 11-15, 2013, pp. 1-6. (Year: 2013).*

(Continued)

*Primary Examiner* — Un C Cho
*Assistant Examiner* — Lalita W Pace
(74) *Attorney, Agent, or Firm* — Xsensus LLP

(57) ABSTRACT

A wireless telecommunications system comprises a network infrastructure equipment, and a terminal device configured to communicate over a radio interface that supports a downlink channel for conveying a message from the network infrastructure equipment to the terminal device. The network infrastructure equipment is configured to selectively transmit the message with a number of repetitions. The message is transmitted on radio resources selected by the network infrastructure equipment from a plurality of candidates for radio resources that define a search space for the terminal device to search for the message. The plurality of candidates comprise candidates associated with a number, N, of different repetition levels for the transmission of a (Continued)

message. Different repetition levels correspond with different numbers of repetitions for the transmission of a message.

18 Claims, 10 Drawing Sheets

(51) Int. Cl.
*H04W 28/02* (2009.01)
*H04L 5/00* (2006.01)

(52) U.S. Cl.
CPC .............. *H04L 1/1874* (2013.01); *H04L 5/00* (2013.01); *H04W 28/0215* (2013.01); *H04W 28/04* (2013.01)

(56) References Cited

U.S. PATENT DOCUMENTS

| | | | | |
|---|---|---|---|---|
| 2010/0037115 | A1* | 2/2010 | Zheng | H04L 1/1822 714/749 |
| 2010/0316146 | A1* | 12/2010 | McBeath | H04L 5/0091 375/260 |
| 2013/0194997 | A1* | 8/2013 | Zhu | H04L 5/0094 370/312 |
| 2014/0078978 | A1* | 3/2014 | Cheng | H04L 5/0053 370/329 |
| 2014/0269594 | A1* | 9/2014 | Jang | H04L 5/0048 370/329 |
| 2015/0131579 | A1* | 5/2015 | Li | H04L 1/08 370/329 |
| 2016/0135176 | A1* | 5/2016 | Wong | H04W 4/70 370/329 |
| 2017/0280447 | A1* | 9/2017 | Uchino | H04W 4/00 |
| 2018/0198677 | A1* | 7/2018 | Blankenship | H04L 5/0053 |

OTHER PUBLICATIONS

International Search Report dated Sep. 15, 2016, in PCT/EP2016/065308 filed Jun. 30, 2016.
Digital cellular telecommunications system (Phase 2+); Universal Mobile Telecommunications System (UMTS); LTE; Service requirements for Machine-Type Communications (MTC); Stage 1 (3GPP TS 22.368 version 12.4.0 Release 12), ETSI TS 122 368 V12.4.0, (Oct. 2014), 23 pages.
Holma, et al. "LTE for UMTS OFDMA and SC-FDMA Based Radio Access", John Wiley and Sons, 2009, 4 pages.
"Physical downlink control channel for enhanced coverage MTC UE", Ericsson, 3GPP TSG RAN WG1 Meeting #75, R1-135646, Nov. 2013, 6 pages.

\* cited by examiner

TELECOMMUNICATIONS APPARATUS AND METHOD FOR CONVEYING A MESSAGE OVER SELECTED CANDIDATE RADIO RESOURCES IN A SEARCH SPACE

BACKGROUND

Field

The present disclosure relates to telecommunications apparatus and methods.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Mobile communication systems have evolved over many years from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Although there are situations which benefit from high data rates now supported in wireless telecommunications systems, there are also some situations in which high data rates are not required. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server relating to the customer's consumption of a utility such as gas, water, electricity and so on. Further information on characteristics of MTC-type devices can be found, for example, in the corresponding standards, such as ETSI TS 122 368 V12.4.0 (2014-10)/ 3GPP TS 22.368 version 12.4.0 Release 12 [1]. Some typical characteristics of MTC type terminal devices/MTC type data might include, for example, characteristics such as low mobility, high delay tolerance, small data transmissions, infrequent transmission and group-based features, policing and addressing.

Because MTC devices typically require only modest communications capabilities they may be provided with reduced capabilities as compared to conventional smartphone type devices to reduce costs. In this respect, MTC devices may also be referred to as reduced capability devices. Reducing costs can be particular important for MTC devices because they can be expected to be deployed widely.

One area where it has been proposed to reduce costs for MTC devices is in respect of their operating bandwidths. Whilst a conventional LTE terminal device might be expected to support operations over a 20 MHz bandwidth, it can be expected MTC devices may only support operations over relatively narrow bandwidths, for example 1.4 MHz has been proposed. That is to say, MTC devices may be narrowband devices. It has also been proposed that MTC devices should support so-called coverage extension/coverage enhancement, for example providing an effective additional 15 dB in signalling power as compared to more conventional terminal devices. This has been proposed because it may be expected that MTC devices will often be in locations which are difficult to reach from a radio perspective, for example in the basement of a building in the case of an MTC device associated with a smart meter.

One approach for providing coverage extension is to rely on repeated transmissions of signalling in multiple subframes. A terminal device may then combine the signalling received for a plurality of repeated transmissions to increase the likelihood of successfully decoding the signalling, e.g. using chase combining/maximal ratio combining techniques. This repeated transmission approach may be applied for control signalling (e.g. sent on a physical downlink control channel such as (E)PDCCH in LTE) and/or other signalling (e.g. sent on a physical downlink shared channel such as PDSCH in LTE).

One draw-back of a repeated transmission approach for providing coverage extension, for example in the context of low-cost MTC terminal devices, is a potential need for increased receiver complexity to allow terminal devices to handle the potential for repeated transmissions, especially in situations where the network has flexibility over the numbers of repetitions in respect of different data transmissions. In some respects these issues can become even more significant for narrowband operations since these limit the ability to support repetitions in the frequency domain, as opposed to the time domain. There is therefore a need for schemes that support coverage enhancement through message repetition which help reduce the hardware requirements associated with receivers.

SUMMARY

According to one aspect of the present disclosure, there is provided a wireless telecommunications system comprising network infrastructure equipment and a terminal device operable to communicate over a radio interface that supports a downlink channel for conveying a message from the network infrastructure equipment to the terminal device, wherein the network infrastructure equipment is operable to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

According to another aspect of the present disclosure, there is provided a method of operating a wireless telecommunications system comprising network infrastructure equipment and a terminal device operable to communicate over a radio interface that supports a downlink channel for conveying a message from the network infrastructure equipment to the terminal device, wherein the method comprises the network infrastructure equipment selectively transmitting the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

According to another aspect of the present disclosure, there is provides network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the network infrastructure equipment comprises a controller unit and a transceiver unit configured to operate together to cause the network infrastructure equipment to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

According to another aspect of the present disclosure, there is provided a method of operating network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the method comprises selectively transmitting the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

According to another aspect of the present disclosure, there is provided circuitry for network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the circuitry comprises a controller element and a transceiver element configured to operate together to cause the network infrastructure equipment to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

According to another aspect of the present disclosure, there is provided a terminal device for use in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the terminal device comprises a controller unit and a transceiver unit configured to operate together to cause the terminal device to attempt to decode the message on radio resources associated with the different candidates of the search space.

According to another aspect of the present disclosure, there is provided a method of operating a terminal device in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the method comprises the terminal device attempting to decode the message on radio resources associated with the different candidates of the search space.

According to another aspect of the present disclosure, there is provided circuitry for a terminal device for use in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the circuitry comprises a controller element and a transceiver element configured to operate together to cause the terminal device to attempt to decode the message on radio resources associated with the different candidates of the search space.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
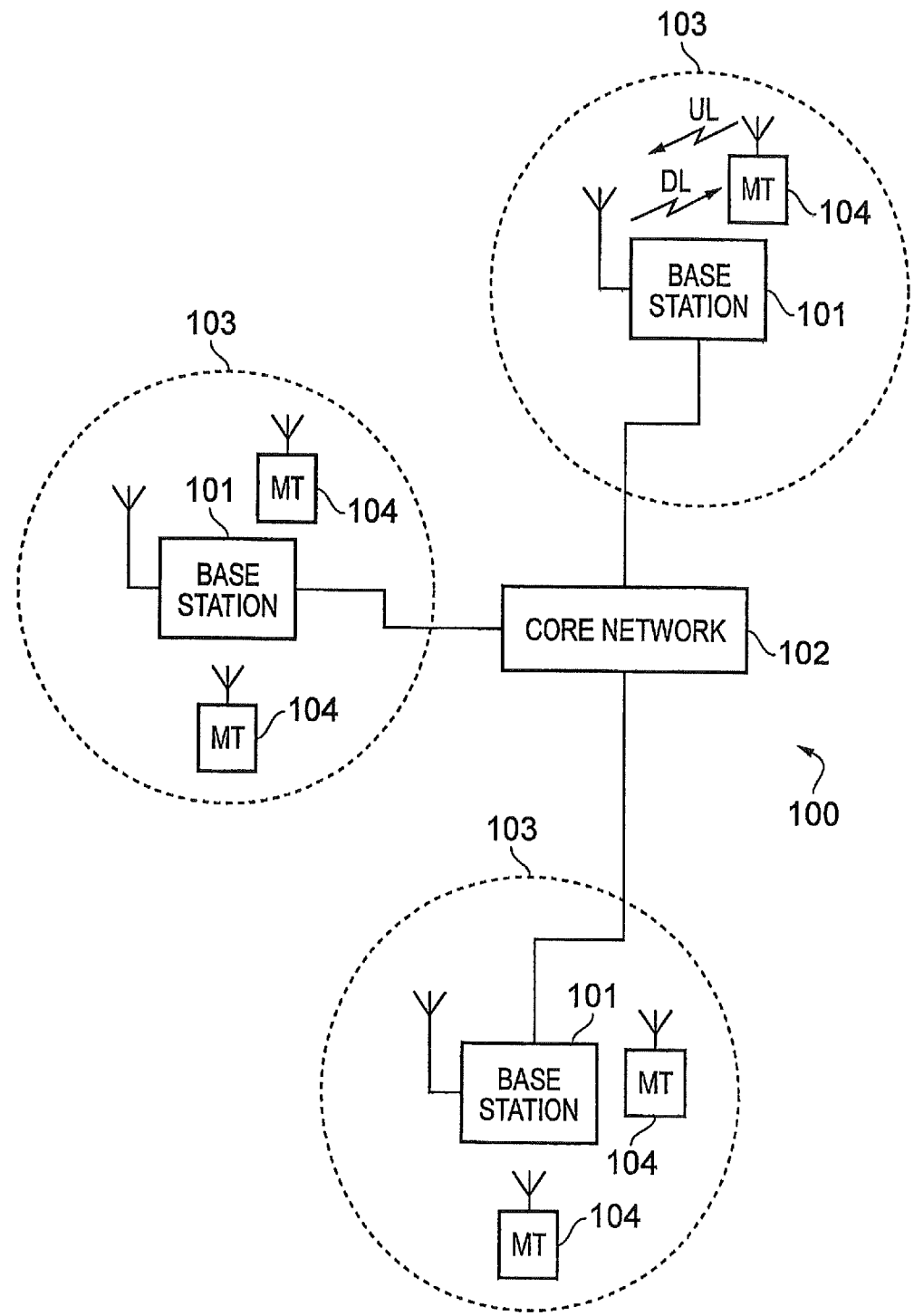
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body and also described in many books on the subject, for example, Holma H. and Toskala A [2]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Terminal devices may also be referred to as mobile stations, user equipment (UE), user terminal, mobile radio, and so forth. Base stations may also be referred to as transceiver stations/nodeBs/e-nodeBs, and so forth.

Figure 2:
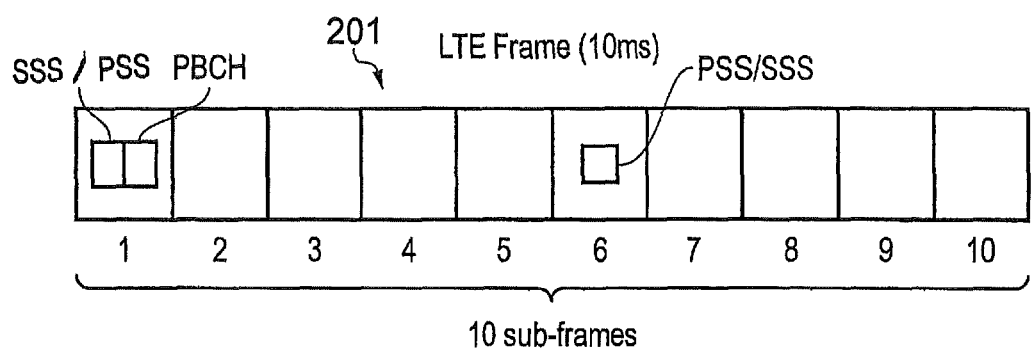
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
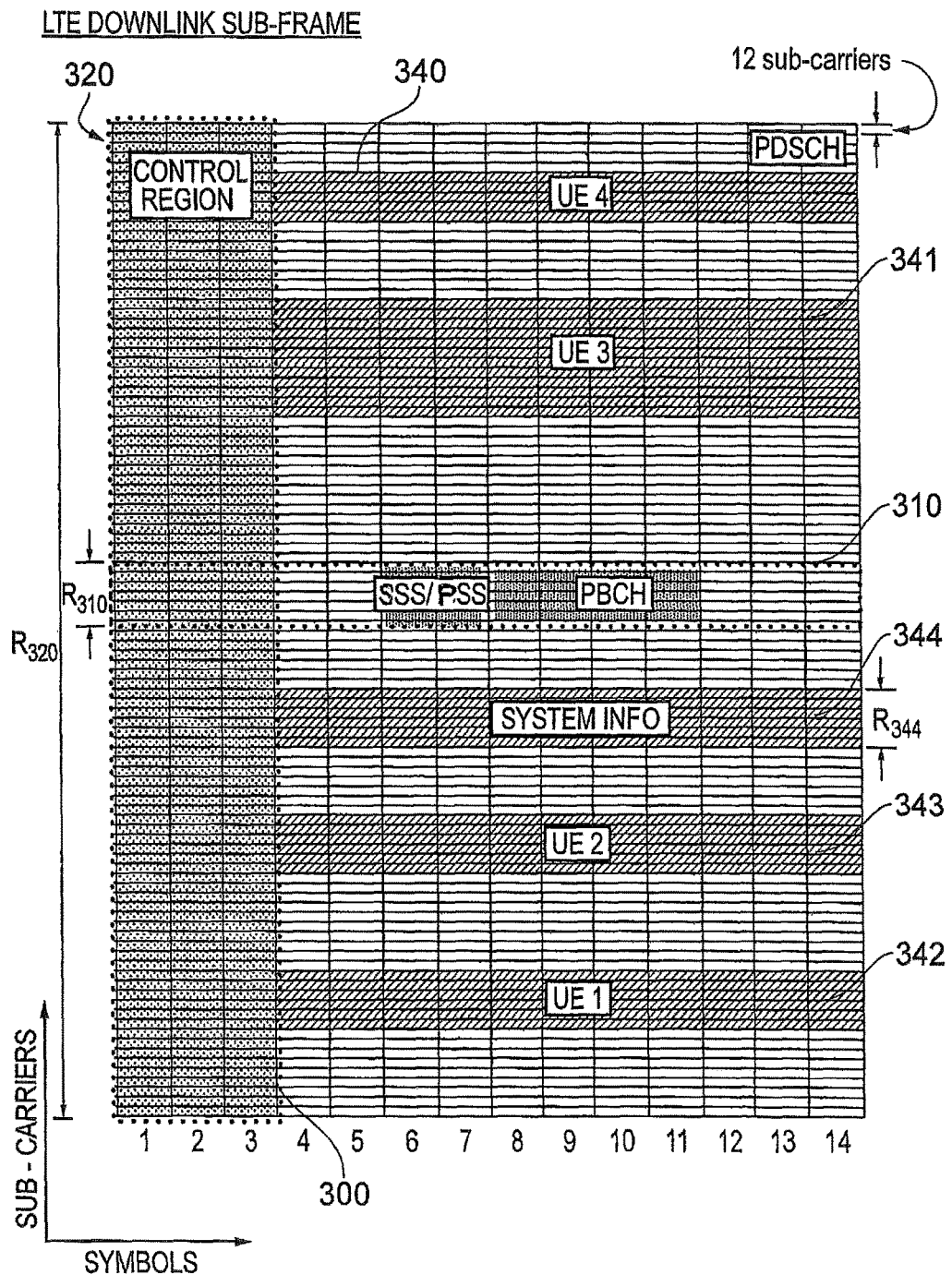
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are discussed further below but not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

As explained above, in a LTE subframe the PDSCH generally occupies groups of resource elements which follow the control region. The data in the blocks of resource elements 340, 341, 342, 343 allocated to the different mobile communication terminals (UEs) and the system information data in the block of resources 344 shown in FIG. 3 have a smaller bandwidth than the bandwidth of the entire carrier. To decode these blocks a terminal first receives the PDCCH spread across the frequency range R320 and/or the EPDCCH to determine if the (E)PDCCH indicates there are PDSCH resources in the subframe that need to be decoded by the UE. The intended recipient(s) for (E)PDCCH signalling in LTE is established through the use of radio network temporary identifiers (RNTI). (E)PDCCH signalling is addressed to a particular RNTI by using the RNTI to scramble cyclic redundancy check (CRC) bits associated with the (E)PDCCH signalling. Each connected UE in a cell is associated with a Cell RNTI (C-RNTI) that may be used to address PDCCH signalling to that particular UE. In addition there are other RNTIs defined and these may be used to simultaneously address groups of terminal devices. For example, a System Information RNTI (SI-RNTI) is defined and PDSCH transmissions comprising SI are allocated by (E)PDCCH signalling addressed to SI-RNTI. Various other RNTIs are defined for various other types of signalling. Some examples include a random-access RNTI (RA-RNTI), a Paging RNTI (P-RNTI), a Transmit Power Control Physical Uplink Control Channel RNTI (TPC-PUCCH-RNTI) and a Transmit Power Control Physical Uplink Shared Channel-RNTI (TPC-PUSCH-RNTI).

Thus, once a UE has received a downlink subframe, the UE searches for (E)PDCCH signalling associated with any RNTI that apply for the UE in the subframe to identify any corresponding allocations of transmission resources on PDSCH. If there is an allocation message addressed to the UE on (E)PDCCH the UE will proceed to decode the PDSCH in the relevant frequency range (if any) indicated by the (E)PDCCH.

Figure 4:
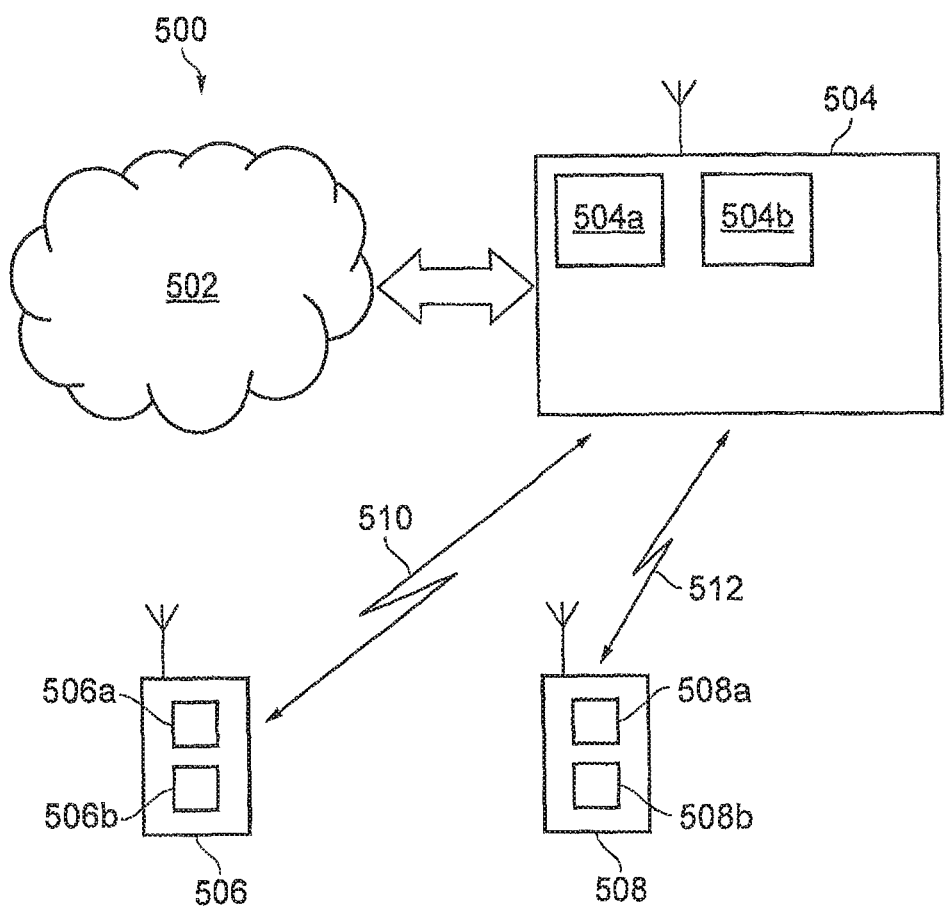
FIG. 4 schematically represents a wireless telecommunications system according to an embodiment of the disclosure.

FIG. 4 schematically shows a telecommunications system 500 according to an embodiment of the disclosure. The telecommunications system 500 in this example is based broadly on a LTE-type architecture, e.g. LTE-advanced. As such many aspects of the operation of the telecommunications system 500 are standard and well understood and not described here in detail in the interest of brevity. Operational aspects of the telecommunications system 500 which are not specifically described herein may be implemented in accordance with any known techniques, for example according to the established LTE standards and known variations thereof.

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 4 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 4 may be broadly conventional apart from where modified to provide functionality in accordance with embodiments of the disclosure as discussed herein.

In this example, it is assumed the first terminal device 506 is a conventional smart-phone type terminal device communicating with the base station 504. Thus, and as is conventional, this first terminal device 506 comprises a transceiver unit 506*a* for transmission and reception of wireless signals and a controller unit 506*b* configured to control the smart phone 506. The controller unit 506*b* may comprise a processor unit which is suitably configured/programmed to provide the desired functionality using conventional programming/configuration techniques for equipment in wireless telecommunications systems. The transceiver unit 506*a* and the controller unit 506*b* are schematically shown in FIG. 4 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device according to an embodiment of the disclosure and which operates over a relatively narrow bandwidth, e.g. 1.4 MHz, and which may be located in an area of restricted coverage. As discussed above, MTC devices may be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 4 is such a device. It will, however, be appreciated that embodiments of the disclosure may also be implemented for other types of terminal device and are not limited to machine type communication devices.

As with the smart phone 506, the MTC device 508 comprises a transceiver unit 508*a* for transmission and reception of wireless signals and a controller unit 508*b* configured to control the MTC device 508. The controller unit 508*b* may comprise a processor unit which is suitably configured/programmed to provide the desired functionality described herein using conventional programming/configuration techniques for equipment in wireless telecommunications systems. The transceiver unit 508*a* and the controller unit 508*b* are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 508 will in general comprise various other elements associated with its operating functionality in accordance with established wireless telecommunications techniques (e.g. a power source, possibly a user interface, and so forth).

The base station 504 comprises a transceiver unit 504*a* for transmission and reception of wireless signals and a controller unit 504*b* configured to control the base station 504. The controller unit 504*b* may comprise a processor unit which is suitably configured/programmed to provide the desired functionality described herein using conventional programming/configuration techniques for equipment in wireless telecommunications systems. The transceiver unit 504*a* and the controller unit 504*b* are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504*b*.

Thus, the base station 504 is configured to communicate data with the smart phone 506 over a first radio communication link 510 and communicate data with the MTC device 508 over a second radio communication link 512. Both radio links may be supported within a single radio frame structure associated with the base station 504. It is assumed here the base station 504 is configured to communicate with the smart phone 506 over the first radio communication link 510 in accordance with the established principles of LTE-based communications and to communicate with the MTC-device 506 over the second radio communication link 512 in accordance with embodiments of the disclosure as described herein. It will be appreciated the base station may readily obtain information indicating the different classes of terminal device which are attached to the base station in accordance with conventional techniques. That is to say, the base station will be aware that the smart phone is of a device class that includes conventional smartphones and the MTC device is of a device class that includes MTC devices. Furthermore, the base station may establish using conventional techniques that the MTC device 508 may be operating in a coverage limited situation such that steps such as message repetition are needed to increase the likelihood of the MTC device being able to decode downlink transmissions.

As discussed above, it has been proposed to improve coverage for terminal devices in a wireless telecommunications system by introducing repetitions of a transmission which a terminal device may combine to provide an increased likelihood of successful decoding. These approaches can be expected to be particularly, but not exclusively, relevant in the field of low complexity MTC (machine type communication) devices, which may be referred as LC-MTC devices. Some of the main characteristics of LC-MTC terminal devices are relatively low complexity (i.e., so they can be provided that low cost), coverage enhancement and reduced power consumption.

One proposed technique to reduce complexity/cost for LC-MTC terminal devices is to restrict the terminal devices to operate on a relatively narrow bandwidths, for example within 6 PRBs (Physical Resource Blocks) in an LTE-based wireless telecommunications system. This overall system bandwidth may thus be divided into multiple 6 PRB wide narrowbands and the LC-MTC terminal devices may be able to tune into any of these narrowbands.

In respect of coverage enhancement (CE), current proposals in an LTE-context are for the coverage for LC-MTC to be extended by 15 dB (relative to that of Category-1 terminal device). As noted above, one proposed technique for providing coverage enhancement is through repeated transmissions (repetitions) of the same message.

In accordance with established principles, Downlink Control Information (DCI) is sent to a terminal device (UE) by a base station (eNB) for scheduling and control purposes. In an LTE-based context, in particular LTE-advanced, DCI is carried by Enhanced Control Channel Elements (ECCEs). An Enhanced Physical Downlink Control Channel (EPDCCH) consists of one or more ECCEs, where the Aggregation Level (AL) of an EPDCCH is equivalent to the number of ECCEs in an EPDCCH. The AL can in some respects be considered to correspond with the number of times the DCI is repeated within an EPDCCH (i.e. the degree of redundant transmissions). The eNB may use EPDCCH with different ALs to send a DCI message to a UE to take account of different radio conditions. For example the eNB might use an EPDCCH with relatively high AL (e.g. AL=16) to send a DCI to a UE at a cell edge and an EPDCCH with relatively low AL (e.g. AL=1 or 2) to a UE close to the eNB.

Figure 5:
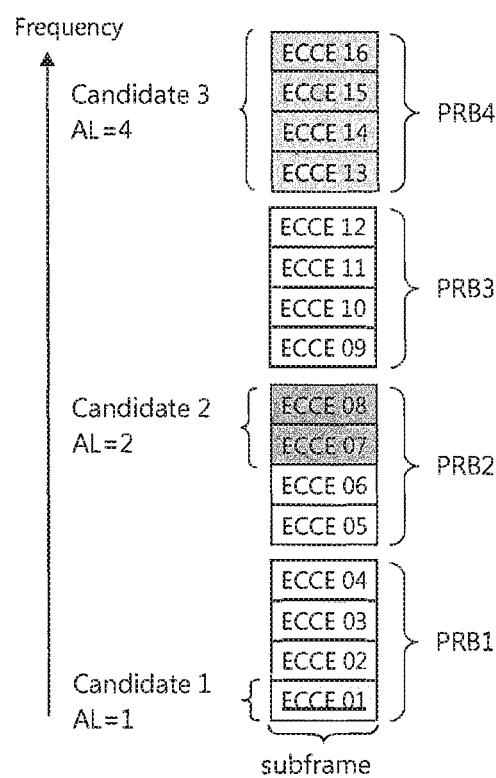
FIG. 5 schematically represents an LTE search space with 16 enhanced control channel elements and showing the principle of aggregation levels in wireless telecommunications systems.

A search space consists of several ECCEs over two or more PRBs. For example, FIG. 5 schematically represents a search space with 16 ECCEs (labelled as ECCE 01, ECCE 02, . . . , ECCE 16) occupying 4 PRBs where each PRB in this example contains 4 ECCEs. The search space is represented as a transmission resource grid extending in frequency over a bandwidth corresponding to 16 ECCE and in time by one subframe for the example represented in FIG. 5.

An EPDCCH with a specific AL occupying specific ECCEs forms an EPDCCH candidate. Thus FIG. 5 indicates 3 different EPDCCH candidates, where Candidate 1 with AL=1 occupies ECCE 01, Candidate 2 with AL=2 occupies ECCE 07 and ECCE 08 and Candidate 3 with AL=4 occupies ECCE 13, ECCE 14, ECCE 15 and ECCE 16. Multiple EPDCCH candidates with the same AL but occupying different ECCEs are possible in a search space, e.g., for the example of FIG. 5, there are potentially 16 EPDCCH candidates with AL=1, potentially 8 EPDCCH candidates with AL=2, and so on up to potentially 1 EPDCCH candidate with AL=16. The EPDCCH candidates are predefined for a specific search space size and are signalled to the UE. The eNB sends a DCI message to the UE using one of the EPDCCH candidates within the search space to the UE. The eNB may select which EPDCCH candidate to use for a given DCI message having regard to established scheduling considerations, for example having regard to the current radio channel conditions for the UE and the availability of radio resources not being used for communicating with other terminal devices (UEs). On receiving radio resources corresponding to the search space, the UE performs blind decoding, i.e., attempts to decode the different EPDCCH candidates in its search space in turn to seek to decode the DCI on the EPDCCH candidate. That is to say, the UE does not know which EPDCCH candidate (if any) was selected by the base station for sending a DCI message to the terminal device in the current scheduling opportunity and so the UE tries to decode a DCI message on the radio resources associated with each of the potential EPDCCH candidates in turn until it can decode a message. If in a given subframe the eNB did not address any EPDCCH message to the UE, the UE would nonetheless attempt to decode the signalling received on the radio resources associated with all the different EPDCCH candidates without detecting a message.

The above description sets out some of the general principles for operating a downlink control channel for conveying control messages in a wireless telecommunications system, such as an LTE-based wireless telecommunications system. It is to be expected that similar principles may be adopted in respect of MTC communications, although potentially with dedicated channels being adopted for supporting MTC communications. In this respect, for LC-MTC, the DCI may be carried by a downlink control channel which may be referred to as MPDCCH with the general operating principles for the MPDCCH being based on those of the EPDCCH. However, in order to reach an LC-MTC UE in limited coverage areas using coverage enhancement, MPDCCH may be configured to support repeated transmissions (allowing the UE to obtain multiple signalling samples for the message). In this regard, it may be expected for ease of implementation for the location of ECCEs for an AL of a MPDCCH candidate (i.e. in terms of frequency location within the operating bandwidth the MPDCCH) will be at the same locations for the repetitive samples, i.e., the search space is repeated for each transmission. This allows the LC-MTC UE to perform simple symbol combining of the repetitive samples (repetitions).

It is also expected that the number of repetitions to use for any given control message transmission may be selectable by the base station. In this respect, there may be the potential for transmissions with the same aggregation level and using the same ECCE locations, but having different repetition lengths, and these may be considered different candidates of the search space. That is to say, in addition to AL and the position of the ECCE within the search space, repetition level RL, (i.e. reflecting the number of repetitions) provides another degree of freedom for establishing the candidates defining the search space.

For the example of narrowband operation spanning 6 PRBs in an LTE context, the maximum size of an MPDCCH search space in the frequency domain is 24 ECCEs. Hence the maximum AL for a MPDCCH is 24. By introducing the potential for candidates having different repetition levels there is a corresponding increase in the number of potential candidates that may comprise a UE's search space. That is to say, there will be numerous combinations of aggregation level (AL) and repetition level (RL) giving rise many different MPDCCH candidates. In this regard it can be expected that in some implementations the number of possible AL may be reduced to reduce the blind decoding effort of the LC-MTC UE.

Figure 6:
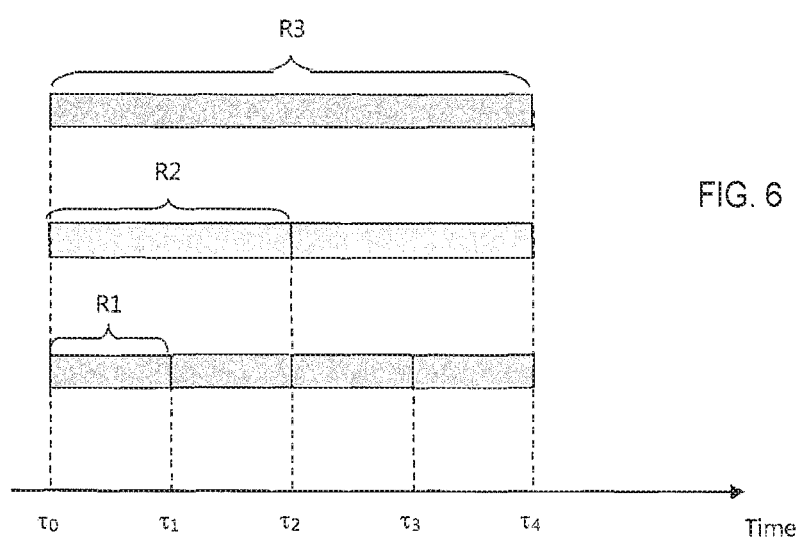
FIG. 6 schematically represents a search space comprising search space candidates with different repetition levels.

An example of MPDCCH search space is schematically shown in FIG. 6. This represents a search space extending in time (along the horizontal axis) and in frequency (along the vertical axis). It is, however, important to note the horizontal bands in the figure representing the different potential candidate radio resources for transmitting control messages (i.e. the candidates) are shown offset from one another in FIG. 6 for ease of representation, but in practice these candidates will span the same/overlapping frequency resources. Thus, referring to FIG. 6, the search space in this example consists of 3 different RLs, namely R1, R2 and R3. For each RL and there can be several ALs and combinations of ECCE locations comprising different candidates for a given RL at different times in the search space. Aspects of the operation relating to the different aggregation levels and ECCE combinations for the different candidates are not generally reflected in the figures described herein since these aspects of the operation may be adopted generally in accordance with conventional techniques.

Thus, in addition to spanning a range of frequency resources, the MPDCCH search space also spans the time domain to include retransmissions, and in particular, the possibility for different numbers of transmissions associated with different repetition levels. For example, one candidate, identified as R3, has the highest repetition level (i.e. corresponds with the most repetitions). It is to be noted that although FIG. 6 is referred to here as representing one candidate for repetition of R3, it will be appreciated that in practice there will typically be multiple candidates with repetition of R3 with different AL and ECCE locations. However, for ease of explanation it is assumed here there is only one candidate (i.e. one AL and one combination of ECCE locations) for each repetition level. The repetitions associated with repetition level R3 take place over a period of time from T0 to T4. However, there are also other candidates with other repetition levels. For example, there are four candidates associated with repetition level R1, namely a candidate comprising repetitions from T0 to T1, a candidate comprising repetitions from T1 to T2, a candidate comprising repetitions from T2 to T3, and a candidate comprising repetitions from T2 to T4. For the middle repetition level R2 there are two candidates, namely a candidate comprising repetitions from T0 to T2 and a candidate comprising repetitions from T2 to T4.

This approach of supporting different repetition levels provides a base station with flexibility in establishing an appropriate compromise between the amount of repetition required for messages to be received and the efficiency of resource utilisation (by allowing the base station to use fewer transmissions when the highest number of possible retransmissions is not needed). That is to say, providing for multiple candidates with smaller repetitions within the time required to transmit the repetitions for a single candidates having more repetitions (i.e. having a higher repetition level) can help provide more scheduling opportunities for the eNB than would otherwise be the case. For example in the example of FIG. 6, the eNB could potentially schedule the LC-MTC UE with RL=R1 at four different times within the search space period spanning T0 to T4. The number of individual retransmissions comprising is transmission level are not significant. For example, transmission level R1 might comprise 8 retransmissions, transmission level R2 might comprise 16 retransmissions, and transmission level R3 might comprise 32 retransmissions. However, in other implementations there may be different numbers of retransmissions in the respective transmission levels, and indeed different numbers of transmission levels. Furthermore, it is not necessary for the number of retransmissions in the different transmission levels to be related to another by integer multiples, although adopting such a relationship can be expected to simplify implementation.

Although the approach of adopting candidates as discussed above with reference to FIG. 6 allows for control messages to be selectively sent with high repetition levels (e.g. using a high number of repetitions for when a UE is in relatively poor coverage) or to be sent more efficiently with a lower number of repetitions (e.g. when a UE is in experiencing relatively good coverage), thereby providing the base station with a great degree of flexibility in how it schedules transmissions for the terminal device, it does have ramifications for the hardware requirements of the terminal device. In particular, the arrangement represented in FIG. 6 would require the terminal device to buffer multiple versions of the transmissions received from the base station. For example, to maximise the number of candidates in the search space the terminal device should be provided with the multiple MPDCCH buffers, namely one for each repetition level. In this regard one MPDCCH buffer may be considered to be a buffer having a size which is sufficient to store data associated with one message. Repeat transmissions can be accumulated in a single buffer in accordance with conventional techniques. That is to say, if a message comprises K bits of data, and these are transmitted with L repetitions, a single buffer of length K can be used to accumulate the samples associated with the L retransmissions by combining the samples for each retransmission with the existing contents of the buffer. However, to make full use of all available candidates in the search space represented in FIG. 6, additional buffers are needed.

To illustrate this point, refer again to FIG. 6. An LC-MTC UE operating with this search space would start accumulating MPDCCH repetition samples at time T0. At time T1 the UE would perform blind decoding for all candidates with RL=R1 (i.e. all aggregation levels and combinations of ECCE locations for candidates having a number of repetitions corresponding to the repetition level R1). If the LC-MTC UE fails to detect any MPDCCH message at T1, it will need to accumulate MPDCCH repetition samples from T1 to T2 to try other possible candidates with RL=R1. However, the UE cannot simply flush the buffer used to accumulate samples from T0 to T1 to allow it to accumulate from T1 to T2 to check for the next set of possible candidates with RL=R1. This is because these buffer contents are still needed for seeking to decode candidates having higher levels of repetition. Hence the UE needs to allocate a new buffer to accumulate the samples from T1 to T2 separately from the ongoing accumulation of these new samples with the already accumulated samples from T0 to T1. Similarly, at T2 the UE would perform blind decoding for all candidates with RL=R1 in respect of the samples collected between T1 and T2 and stored in one MPDCCH buffer and blind decoding for all candidates with RL=R2 in respect of the samples collected between T0 and T2 and stored in another MPDCCH buffer. The same applies for each higher repetition level. Thus, in order to implement the search space as shown in FIG. 6, an MPDCCH buffer (memory) is required for each different RL. This can give rise to issues because a legacy UE may not have sufficient memory to buffer multiple versions of EPDCCH for the different repetition levels, and in any event providing a UE with the ability to do this would increase device hardware requirements, and therefore cost.

To help address this issue, the inventor has proposed an approach in which the arrangement (in position and time) of the candidates with different Repetition Levels (RL) within a search space grid is a function of the LC-MTC UE buffer available for MPDCCH repetition accumulation.

That is to say, the inventor has proposed a wireless telecommunications system that comprises a base station (or other network infrastructure equipment) and a terminal device (such as a machine type communication device). The base station and the terminal device communicate with one another over a radio interface that supports a downlink channel, e.g. a type of PDCCH, such as MPDCCH, for conveying a message, such as a control message/DCI message with a selected number of repetitions to enhance the likelihood the terminal device will successfully decode the message. The message is transmitted on radio resources selected by the network infrastructure equipment from a plurality of candidates for radio resources which define a search space for the terminal device to search for the message. The plurality of candidates comprise candidates associated with a number, N, of different repetition levels for the transmission of a message, wherein the different repetition levels correspond with different numbers of repetitions for the transmission of a message. In accordance with the terminology used herein, higher repetition levels are associated with more repetitions. The candidates that define the search space are arranged within a search space grid of radio resources extending in frequency and time, wherein the extension in frequency is sufficient to span a range of frequencies over which the message may be transmitted and the extension in time is sufficient to span this a transmission of a message at a highest repetition level associated with the highest number of repetitions. The terminal device comprises a number, M, of message buffers, each message buffer having a size sufficient to store data associated with one message, wherein the number of message buffers M is less than the number of repetition levels N. This allows a number of different repetition level to be used without requiring a corresponding increase in the number of buffers M. For example, the number buffers may even be one (i.e. M=1). To help achieve this, the inventor has recognised the arrangement of candidates defining the search space within the search space grid (i.e. the radio resource transmission grid from which the candidates defining the search space may be drawn) for the terminal device should be determined in a way depends on the number of message buffers M for the terminal device and the number of repetition levels N. There are number of different principles can be applied when determining an appropriate arrangement in any given implementation, as explained further below.

As noted above, a UE's MDPCCH buffer is the amount of memory that it has available for storing MPDCCH repetition samples. This can be fixed in accordance with an operating standard of the wireless telecommunications system, for example with different categories of terminal device having different predefined buffering capabilities, or an indication of the UE's buffer capabilities may be signalled to the network, for example as part of UE capability signalling, to allow the network to configure an appropriate search space with an appropriate number of repetition levels for the UE based on its number of buffers in accordance with the principles described herein.

Figure 7:
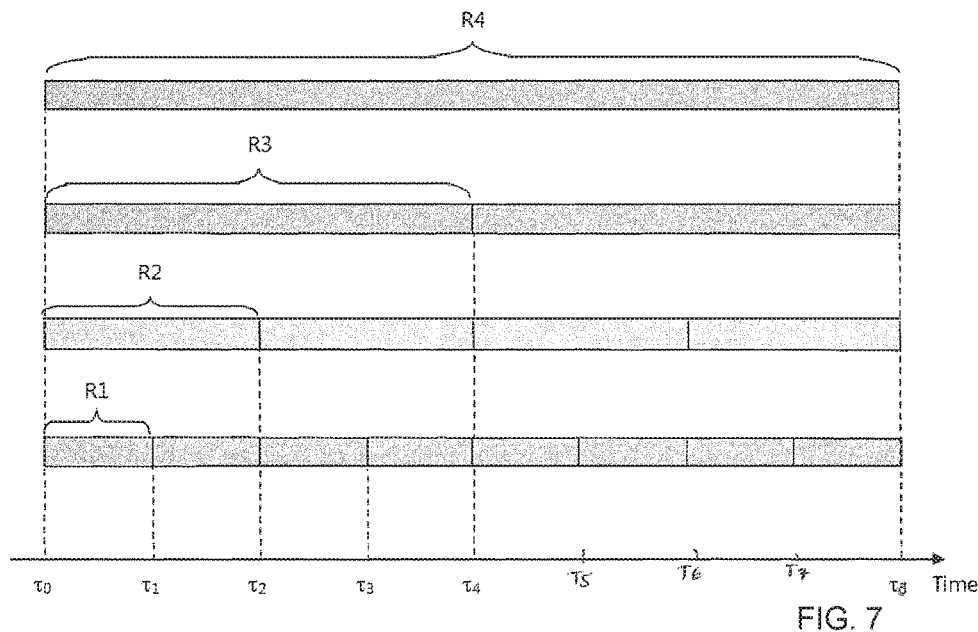
FIGS. 7 to 13 schematically represent search spaces comprising different arrangements of search space candidates within a search space grid.

In a scenario where the number of MPDCCH buffers exceeds the number of RL the base station, the search space may comprise all the potential candidates in the search space grid, as in the example represented in FIG. 6, and represented again in FIG. 7 in the context of an implementation with 4 repetition levels. FIG. 7 is similar to, and will be understood from, FIG. 6 discussed above, but differs in also represented an additional repetition level, namely R4.

Thus, in FIG. 7 the search space of candidates for radio resources for conveying a control message includes candidates having four different repetition levels namely R1, R2, R3 and R4. The UE in this example scenario has sufficient MPDCCH buffer capacity to separately accumulate samples for each of the repetition levels. The base station on determining the UE has sufficient MPDCCH buffer capacity, for example from standard specifications or from capability information received from the terminal device, therefore has complete freedom in scheduling MPDCCH for transmission within the search space grid (i.e. the search space can correspond with the search space grid without any gaps).

However, it is perhaps more likely there will be scenarios where a terminal device will not have a sufficient number of MPDCCH buffers to maintain a separate accumulation of samples for each repetition level. In this case the terminal device will not be able to make use of the complete search space grid and its search space will be limited to a subset of the candidates that would otherwise in principle be available within the search space grid (i.e. the candidates represented by shading in FIG. 7).

Figure 8:
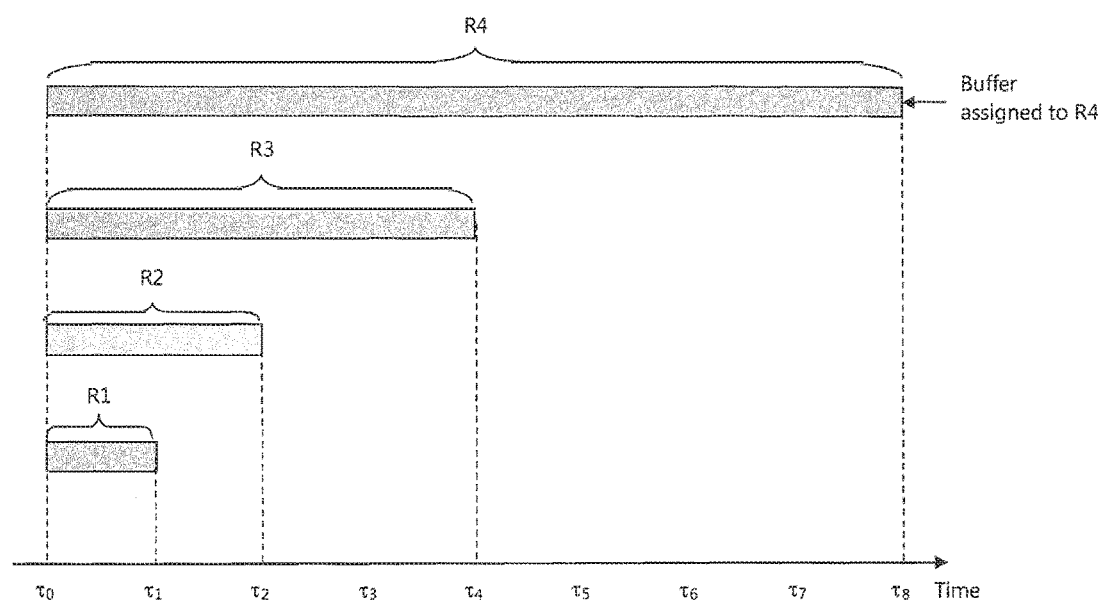

To facilitate explanation it can be helpful to define a time instance of a RL as the time period the different candidates in this RL occupy in the search space grid. For example, with reference to FIG. 7, there are 8 time instances for repetition level R1 (one from T0 to T1, one from T1 to T2, one from T2 to T3, and so on up to T7 to T8). There are four time instances for repetition level R2 (one from T0 to T2, one from T2 to T4, one from T4 to T6, and one from T6 to T8). There are two time instances for repetition level R3 (one from T0 to T4 and one from T4 to T8). There is one time instance for repetition level R4 (from T0 to T8). Thus, in FIG. 7 candidates are available for all time instances for all repetition levels FIG. 8 is similar to, and will be understood from, FIG. 7, but shows an arrangement of candidates for the situation in which the search space again comprises four different repetition levels, but the terminal device only have the capability to buffer (accumulate) one copy of the samples (i.e. the UE has only one MPDCCH message buffer). In this example the MPDCCH buffer is allocated/assigned to operate on an accumulation and flushing cycle corresponding to the highest repetition level, i.e. R4. That is to say, the buffer is configured to accumulate samples from T0 to T8 without any flushing (unless a message is successfully decoded before T8). Thus, in accordance with approaches in accordance with certain embodiments of the disclosure, when the number of MPDCCH buffers is less than the number of repetition levels, one MPDCCH buffer may always be assigned to the largest repetition level. This recognises that if no MPDCCH message has yet been detected within a search space, the largest RL will remain a source of potential candidates, and so all the sample accumulations from the start of the search space needs to be maintained. For example, referring to FIG. 8, if at time T4, no MPDCCH with RL=R1, RL=R2 or RL=R3 has been detected, the repetitive samples of the search space accumulated till time T4 cannot be discarded since they are needed for potential candidates with RL=R4.

The shaded regions in FIG. 8 represent the areas (i.e. time instances) of the search space grid which can potentially include candidates to define the search space for the terminal device in this configuration. Although the single available buffer is primarily allocated/dedicated to the highest RL, the buffer may also be used to allow for candidates with lower repetition levels, although only for candidates which start at the same time in the search space resource grid as candidates for the highest repetition level. Thus, for a terminal device having one MPDCCH buffer, the base station may be configured to establish a search space comprising candidates arranged within the search space grid in a pattern that depends on the number of buffers. In the example of FIG. 8 there is only one time instance for each RL that can be used as a candidate for the search space. This is because the same buffer must be shared for all the different RLs. Put simply, the search space cannot include candidates of repetition level R1 in the time instances from T1 to T8 because there is no buffer capacity for separately accumulating samples during these times. Allocating the single available buffer to the highest repetition rate allows the search space to include the greatest range of different repetition levels to allow the base station most flexibility in terms of efficiently scheduling the terminal device under different radio conditions. Accordingly, although the use of only one MPDCCH buffer impacts the scheduling flexibility for the base station in terms of the number of scheduling opportunities, it is still possible to select from different repetition levels, for example to take account of changing radio conditions. It may be noted the arrangement of FIG. 8 supports search spaces comprising candidates on four time instances as compared the arrangement of FIG. 7 which supports search spaces with candidates on up to 15 time instances.

Figure 9:
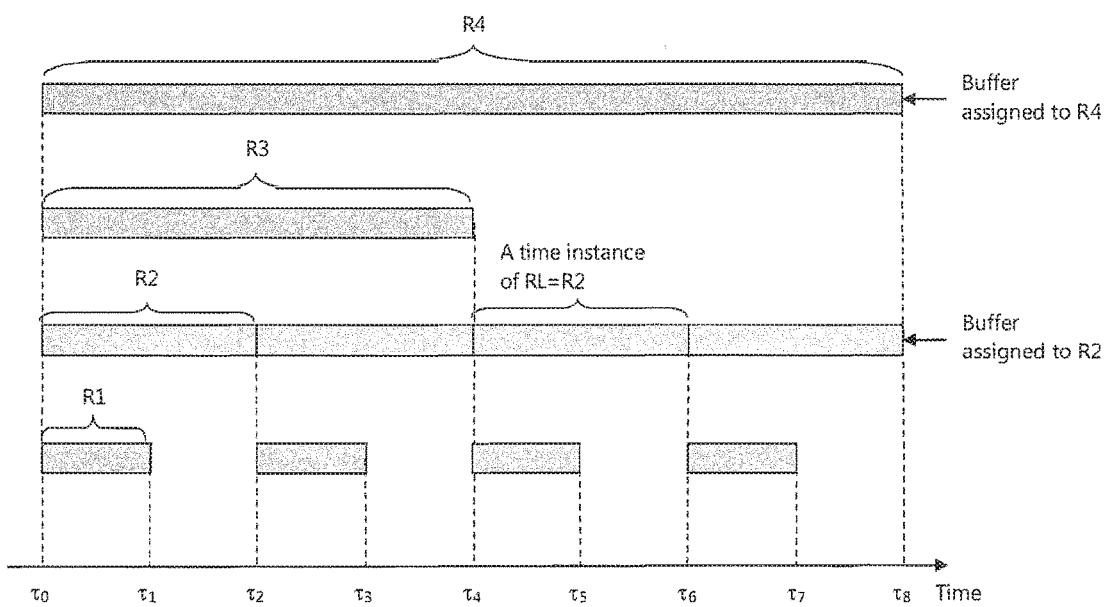

FIG. 9 is similar to, and will be understood from, FIGS. 7 and 8, but shows an arrangement of candidates for the situation in which the search space again comprises four different repetition levels, but the terminal device has the capability to buffer (accumulate) two copies of the samples (i.e. the UE has two MPDCCH message buffers). In this example one MPDCCH buffer is allocated/assigned to operate on an accumulation and flushing cycle corresponding to the highest repetition level, i.e. R4. The other MPDCCH buffer is allocated/assigned to operate on an accumulation and flushing cycle corresponding to a lower repetition level, which in this case is not the second highest repetition level R3, but the next repetition level down, R2. The shaded regions again represent the areas (i.e. time instances) of the search space grid which can potentially be used for candidates to define the search space for the terminal device in this configuration.

Although the available buffers are primarily allocated/dedicated to the repetition levels R4 and R2, they can again be used to accumulate samples for lower repetition levels for time instances that start at the same time. More generally, in accordance with certain embodiment of the disclosure, a RL that does not have a dedicated buffer may share its buffer with a higher RL that has a dedicated buffer, at least in respect of time instances starting at the same time for both RL, where the difference between the RLs is minimised. For example, in FIG. 9, the search space has 4 RLs {R1, R2, R3, R4} and the UE has only 2 MPDCCH buffers so dedicated buffers are allocated to R2 and R4 (the highest RL). Candidates for R1 and R3 do not have a dedicated buffer but share with other RLs. For R1, the next highest RL is R2 and so rather than share its buffer with R4, it shares with R2, which allows for more time instances of R1 to be used as candidates than in the case of FIG. 8. More specifically, the approach of FIG. 9 supports search spaces comprising candidates on 10 time instances (as opposed to 4 time instances in FIG. 8).

As has been noted above, for situations in which a single buffer is used in respect of candidates having different repetition levels, there can only be one time instance containing candidates with the lower repetition level within the time instance for candidates having the higher repetition level, and the candidates for the two repetition levels should start at the same time to allow the buffer to be shared.

It may be noted the specific allocation of buffers to R4 and R2 in FIG. 9 is only one example. Generally it is to be expected one of the buffers should always be allocated to the highest repetition level, but the other buffer(s) may be allocated differently according to the application at hand. For example if the base station wishes is to provide the maximum number of candidates whilst also supporting at least one candidate at the highest repetition level, the approach of FIG. 9 should be modified to have one buffer assigned to repetition level R4 and one buffer assigned to repetition level R1 This would provide an increase in the overall number of time instances for candidates (it would provide 11 time instances, namely one each for R4, R3 and R2 and 8 for R1). If, on the other hand, it is considered more appropriate to provide a greater number of high level repetition opportunities, at the cost of fewer time instances for candidates over all, the approach of FIG. 9 should be modified to have one buffer assigned to repetition level R4 and one buffer assigned to repetition level R3. This would provide a reduction in the overall number of time instances for candidates (it would provide 7 time instances, namely one for R4 and two each for R3, R2 and R1), but a higher proportion of the time instances are associated with higher repetition levels, which may be preferable for a terminal device which frequently needs to rely on greater degrees of coverage extension.

It will be appreciated that the repetition arrangements discussed herein can reduce the number/rate of scheduling opportunities for the base station's scheduler. For example, with reference to FIG. 8, a base station may use a candidate with repetition level R1 to convey a resource allocation to a terminal device within the period T0 to T1. However, the base station would then wait until after T8 (i.e. until after the end of the terminal device's search space) before it can reschedule the terminal device again. As well as reducing scheduling opportunities for the eNB scheduler, the approaches may also impact the potential peak data throughput of the LC-MTC UE.

To help address this in accordance with certain embodiments a terminal device's search space may in effect be "restarted" before the end of the longest repetition period if a message is successfully decoded from a candidate before the end of the search space duration.

Figure 10:
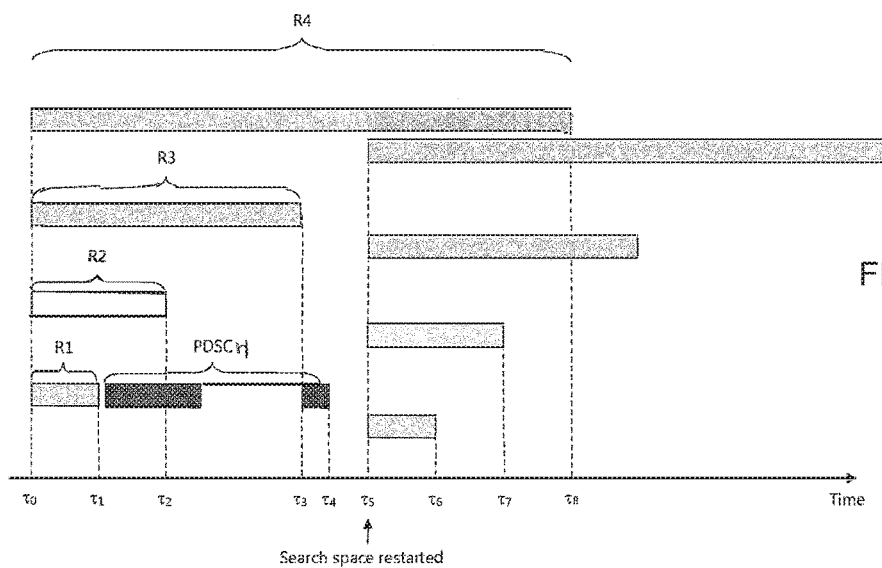

An example of this is schematically represented in FIG. 10. As for FIG. 8, FIG. 10 schematically represents in shading the time instances when there may be candidates for a situation in which there are four repetition levels and a terminal device has only one MPDCCH buffer. In the example of FIG. 10 it is assumed the base station elects to transmit downlink control information comprising a resource allocation identifying resources on a physical downlink shared channel (PDSCH) on a candidate in the search space with a repetition level R1, this being transmitted between T0 and T1. Assuming no errors in transmission, the terminal device is thus able to derive the relevant control information soon after time T1 and the base station is aware that the terminal device will have done this. Thus, in accordance with some implementations, the base station and terminal device can be configured in this situation to in effect stop the ongoing search space, and instead the base station and terminal device may proceed to immediately, or after a given offset, exchange data on the relevant resources on the PDSCH, as schematically shown in heavy shading in FIG. 10. Not only does this avoid the terminal device having to wait until the end of the search space (i.e. beyond T8) before receiving the scheduled data on PDSCH, once the data on PDSCH has been exchanged (i.e. by T3 in the example indicated in FIG. 10), a new search space can be started, i.e. a search space starting at T5 as schematically represented in FIG. 10. I.e. the buffer is flushed at T5 and proceeds to start with operating with the next search space, which may again corresponding generally to that represented in FIG. 7, except for starting from T5 rather than T0.

Thus, in accordance with certain embodiments the search space may be restarted when a scheduling event completes. For downlink scheduling, this may be when the PDSCH reception ends. In the uplink for Full Duplex FDD, this may be when the MPDCCH reception ends (since the LC-MTC UE can receive another MPDCCH whilst transmitting on PUSCH or PUCCH). An offset can be applied between the end of a scheduling event and the restart of the search space. It will be appreciated that restarting of a search space after completion of a scheduling event (i.e. after the scheduled data transfer has occurred) can also be used in situations where the terminal device has more than one MPDCCH buffer.

Figure 11:
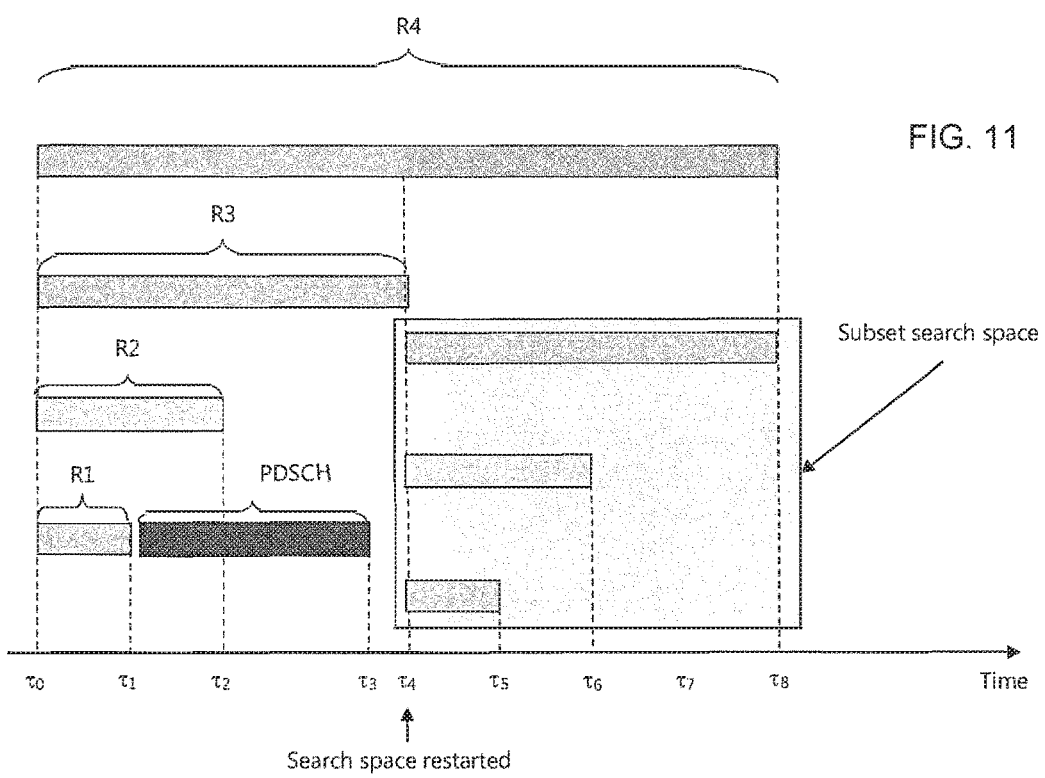

One aspect of the approach represented in FIG. 10 is that the new search space goes beyond the end of the previous search space. In some situations this may not be a preferred approach, for example because the eNB may allocate specific time windows for MTC search spaces for ease of scheduling. For example, the eNB may not wish to allow an MPDCCH search space to extend beyond T8 to leave a period of time to allow for other communications. The approach represented in FIG. 10 may also be subject in some situations to error propagation as the base station and terminal device may become offset in their understanding of the start times for the search spaces. To help mitigate any concerns regarding these issues an alternative approach may be adopted in accordance with some examples of the disclosure, for example as represented in FIG. 11. In many respects this is similar to, and will be understood from, the approach represented in FIG. 10, except the new search space started before the end of the previous search space is restricted in length so as not to extend beyond when the previous search space would have ended. Thus, in accordance with this approach only a subset of RLs of the original search space are used for the new search space, which may thus be referred to as a subset search space. The RLs that are maintained are those which can be fully contained with the time period of the original search space. Thus in the example shown in FIG. 11 (which is again a situation with four repetition levels and one MPDCCH buffer), if an MPDCCH is detected on a candidate with RL=R1 at time T1 and a PDSCH transmission is received up until time T3. A subset of the original search space is restarted at time T4. Since only candidates with RL=R1, R2 and R3 can complete within the remaining search space time (which ends at time T8), candidates with RL=R4 are not included in this subset of search space.

Figure 12:
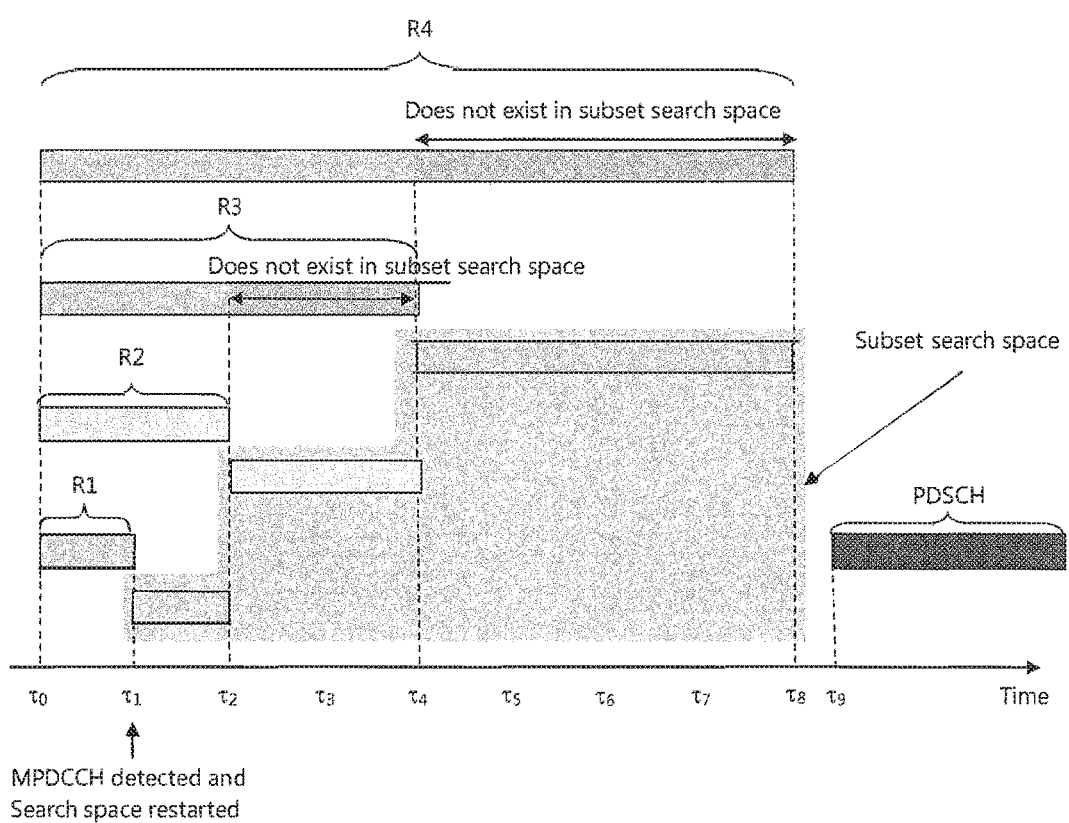

In another embodiment, schematically represented in FIG. 12 the restarting of the search space or subset of search space might start following the UE successfully detecting an MPDCCH message without waiting for a corresponding exchange of data between the base station and terminal device on the allocated resources. That is to say, in this configuration the search space is restarted without waiting for the corresponding PDSCH to complete. The reception of PDSCH would instead start at a later time after completion of the search space. Thus, in the example shown in FIG. 12, the UE detects a MPDCCH message with RL=R1 at time T1. Instead of waiting for reception of PDSCH, a subset of the search space is restarted (this subset of search space can follow the principles described above in relation to FIG. 11, for example). The reception of PDSCH can be delayed to another time, e.g., at time T9, which can be determined by procedures such as an indication in DCI message on MPDCCH or a predefined offset, etc. This approach can allows the eNB to perform consecutive scheduling for the UE thereby helping to increase its throughput. For example, the eNB can proceed to schedule the UE with another MPDCCH with RL=R1 or RL=R2 and yet another (subset) search space may be restarted after time T2 (for R1) or T4 (for R2) respectively.

It will be appreciated for the approaches schematically represented in FIGS. 10, 11 and 12 that allow a new search space to be started before the end of a preceding search space, the new search space need not be the same as the preceding search space (i.e. need not comprise the same candidates). That is to say, rather than being considered as restarting the search space, these approaches may more generally be considered as starting a new search space which may, or may not, correspond with the preceding search space in terms of how the candidates are arranged within the relevant portions of the search space (i.e. the whole search space resource grid in the example of FIG. 10, and the respective subsets of the search space grid in the examples of FIGS. 11 and 12).

Figure 13:
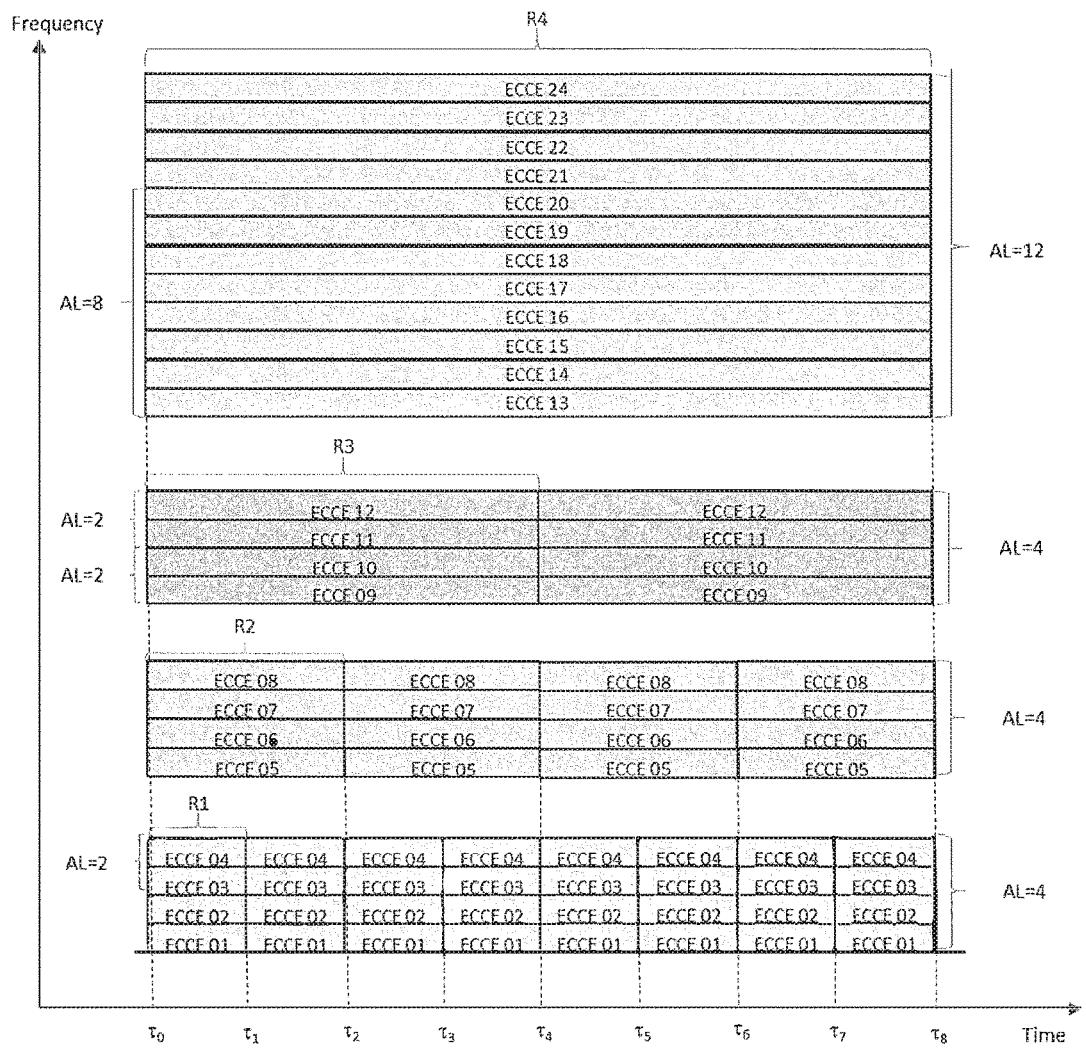

In another example implementation in accordance with certain embodiments of the disclosure a terminal device's MPDCCH buffer may be in effect divided into a plurality of sub-buffers whereby that each different sub-buffer is used for non-overlapping ECCEs. Candidates that have overlapping ECCEs would be restricted to have the same RL. This approach recognises that instead of allocating a full MPDCCH buffer to a single RL, the buffer can be split with different sub-buffers allocated to different RLs as long as the ECCEs in different sub-buffers are not the same. This embodiment enables multiple time instances of different RLs in a search space with only one MPDCCH buffer. An example is schematically shown in FIG. 13, where a single MPDCCH buffer is split into 4 sub-buffers. Such that:

Sub-buffer 1 stores ECCE 01 to ECCE 04 allocated to RL=R1
Sub-buffer 2 stores ECCE 05 to ECCE 08 allocated to RL=R2
Sub-buffer 3 stores ECCE 09 to ECCE 12 allocated to RL=R3
Sub-buffer 4 stores ECCE 13 to ECCE 24 allocated to RL=R4

Within a RL, it is possible to have multiple ALs that overlap each other. For example, for RL=R4, there is one candidate with AL=8 (occupying ECCE 13 to ECCE 20) and another candidate with AL=12 (occupying ECCE 13 to ECCE 24). Since different RL occupy different ECCE (without overlap), and each RL uses a different sub-buffer of a MPDCCH buffer, it is thus possible to have multiple time instances of all the RL.

Thus there has been described wireless telecommunications system comprising network infrastructure equipment and a terminal device operable to communicate over a radio interface that supports a downlink channel for conveying a message from the network infrastructure equipment to the terminal device, wherein the network infrastructure equipment is operable to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message; wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions; wherein the terminal device comprises a number, M, of message buffers, each message buffer having a size sufficient to store data associated with one message, wherein the number of message buffers M is less than the number of repetition levels N, and wherein the arrangement of candidates defining the search space within the search space grid for the terminal device is determined in dependence on the number of message buffers M for the terminal device and the number of repetition levels N.

Approaches in accordance with certain embodiments of the disclosure may in some respects be summarised as providing methods for arranging the MPDCCH candidates with different Repetition Levels in a search space where the position (in time and frequency) of candidates is a function of the buffer space available for storing repetitive samples of the MPDCCH candidates. Thus, in accordance with certain embodiment of the disclosure, different arrangements of candidates in a search space are associated with different terminal device buffer capabilities.

Approaches in accordance with certain embodiments provide methods of adding MPDCCH candidates into an existing search space where additional MPDCCH candidates are added if a message is successfully sent to a UE before the end of the search space.

It will be appreciated there are many modifications to the processes described above that can be adopted. For example, whereas in the various examples the search space grids in which the candidates defining the search space for a terminal devices are arranged are schematically represented in the figures as comprising contiguous radio resources in time frequency, this need not be the case in all implementations and the resources could equally be non-contiguous in time and frequency.

It will also be appreciated that while some of the above-described embodiments have focused on examples in which a base station of the wireless telecommunications system is providing functionality in accordance with the principles described herein, in other implementations similar functionality may be provided by other components of the wireless telecommunications network infrastructure. For example, some, or all, of the processing described above in relation to the base station may be provided by a core network component of the wireless telecommunications system and/or similar functionality may be provided by other infrastructure elements, such as relay nodes.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A wireless telecommunications system comprising network infrastructure equipment and a terminal device operable to communicate over a radio interface that supports a downlink channel for conveying a message from the network infrastructure equipment to the terminal device, wherein the network infrastructure equipment is operable to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

Clause 2. The wireless telecommunications system of any preceding clause, wherein the number of message buffers M is less than the number of repetition levels N.

Clause 3. The wireless telecommunications system of any preceding clause, wherein a first candidate associated with a first repetition level and a second candidate associated with a second repetition level which is higher than the first repetition level are associated with radio resources that overlap in the frequency domain and are arranged in the search space grid to start at the same time.

Clause 4. The wireless telecommunications system of any preceding clause, wherein candidates associated with a number, N-M, of the N repetition levels are arranged in the search space grid to start at the same time as at least one other candidate having a higher repetition level and associated with radio resources which overlap in the frequency domain.

Clause 5. The wireless telecommunications system of any preceding clause, wherein candidates associated with at least one of the N repetition levels are arranged in the search space grid so as to not start at times which do not correspond with a start time for at least one other candidate having a higher repetition level and associated with radio resources which overlap in the frequency domain.

Clause 6. The wireless telecommunications system of any preceding clause, wherein if the message is transmitted on radio resources associated with a candidate having a repetition level which is lower than the highest repetition level in the search space, the network infrastructure equipment is operable to transmit a further message using a further search space that is initiated before the end of the preceding search space.

Clause 7. The wireless telecommunications system of clause 6, wherein the extent of the further search space in the time domain is limited to the time remaining in the preceding search space at the time the further search space is initiated.

Clause 8. The wireless telecommunications system of any preceding clause, wherein the terminal device is operable to allocate one of the M message buffers to operate on an accumulation and flushing cycle having a period that corresponds to a duration spanning the number of repetitions for the highest repetition level.

Clause 9. The wireless telecommunications system of clause 8, wherein the terminal device is operable to not allocate a message buffer to operate on an accumulation and flushing cycle that matches a time period spanning the number of repetitions for the second highest repetition level.

Clause 10. The wireless telecommunications system of any preceding clause, wherein the terminal device is operable to flush a message buffer before the end of its accumulation and flushing cycle if a message is successfully decoded from radio resources associated with one of the candidates for the search space and to start another accumulation and flushing cycle before the end of the search space.

Clause 11. The wireless telecommunications system of any preceding clause, wherein the terminal device is configured to convey an indication of the number of message buffers M to the network infrastructure equipment.

Clause 12. The wireless telecommunications system of any preceding clause, wherein the downlink channel comprises a downlink control channel.

Clause 13. The wireless telecommunications system of any preceding clause, wherein the message comprises a control message.

Clause 14. The wireless telecommunications system of any preceding clause 3, wherein the control message conveys downlink control information comprising an indication of an allocation of radio resources to be used for communicating data between the network infrastructure equipment and the terminal device on another channel supported by the radio interface.

Clause 15. The wireless telecommunications system of any preceding clause, wherein the network infrastructure equipment comprises a base station.

Clause 16. The wireless telecommunications system of any preceding clause, wherein the terminal device comprises a machine-type communication, MTC, device.

Clause 17. The wireless telecommunications system of any preceding clause wherein the radio resources comprising the search space grid are contiguous in time and/or frequency.

Clause 18. A method of operating a wireless telecommunications system comprising network infrastructure equipment and a terminal device operable to communicate over a radio interface that supports a downlink channel for conveying a message from the network infrastructure equipment to the terminal device, wherein the method comprises the network infrastructure equipment selectively transmitting the message with a number of repetitions to enhance the likelihood the terminal device will successfully decode the message,
  wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;
  wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;
  wherein the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

Clause 19. Network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the network infrastructure equipment comprises a controller unit and a transceiver unit configured to operate together to cause the network infrastructure equipment to selectively transmit the message with a number of repetitions to enhance the likelihood the terminal device will successfully decode the message,
  wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;
  wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;
  wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

Clause 20. A method of operating network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the method comprises selectively transmitting the message with a number of repetitions to enhance the likelihood the terminal device will successfully decode the message,
  wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

Clause 21. Circuitry for network infrastructure equipment for use in a wireless telecommunications system comprising the network infrastructure equipment and a terminal device operable to communicate over a radio interface that supports a downlink channel for conveying a message from the network infrastructure equipment to the terminal device, wherein the circuitry comprises a controller element and a transceiver element configured to operate together to cause the network infrastructure equipment to selectively transmit the message with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein the network infrastructure equipment is configured to determine that the terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N.

Clause 22. A terminal device for use in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the terminal device comprises a controller unit and a transceiver unit configured to operate together to cause the terminal device to attempt to decode the message on radio resources associated with the different candidates of the search space.

Clause 23. A method of operating a terminal device in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the method comprises the terminal device attempting to decode the message on radio resources associated with the different candidates of the search space.

Clause 24. Circuitry for a terminal device for use in a wireless telecommunications system comprising network infrastructure equipment and the terminal device operable to communicate with one another over a radio interface that supports a downlink channel for conveying a message from the network infrastructure equipment to the terminal device, wherein the message is selectively transmitted by the network infrastructure equipment with a number of repetitions to enhance the likelihood the terminal device will successfully decode the message, wherein the message is transmitted on radio resources selected by the network infrastructure equipment from a plurality of candidates for radio resources that define a search space for the terminal device to search for the message; wherein the plurality of candidates comprise candidates associated with a number, N, of different repetition levels for the transmission of a message, wherein the different repetition levels correspond with different numbers of repetitions for the transmission of a message;

wherein the candidates that define the search space are arranged within a search space grid of radio resources extending in frequency and time, wherein the extension in frequency is sufficient to span a range of frequencies over which the message may be transmitted and the extension in time is sufficient to span a transmission of a message at a highest repetition level associated with the highest number of repetitions;

wherein terminal device comprises a number, M, of message buffers, each message buffer having a size sufficient to store data associated with one message, and wherein the arrangement of candidates defining the search space within the search space grid for the terminal device is selected in dependence on the number of message buffers M for the terminal device and the number of repetition levels N, and wherein the circuitry comprises a controller element and a transceiver element configured to operate together to cause the terminal device to attempt to decode the message on radio resources associated with the different candidates of the search space.

REFERENCES

[1] ETSI TS 122 368 V12.4.0 (2014-10)/3GPP TS 22.368 version 12.4.0 Release 12
[2] Holma H. and Toskala A, "LTE for UMTS OFDMA and SC-FDMA based radio access", John Wiley and Sons, 2009.

What is claimed is:

1. A wireless telecommunications system, comprising:
a terminal device configured to communicate over a radio interface that supports a downlink channel for conveying a message to the terminal device; and
a network infrastructure equipment configured to selectively transmit the message, over the downlink channel, with a number of repetitions, wherein the message is transmitted on radio resources selected by the network infrastructure equipment from a plurality of candidates for radio resources that define a search space for the terminal device to search for the message,
the plurality of candidates comprise candidates associated with a number, N, of different repetition levels for the transmission of the message,
the different repetition levels correspond with different numbers of repetitions for the transmission of the message,
the candidates that define the search space are arranged within a search space grid of radio resources extending in frequency and time, and an extension in frequency is sufficient to span a range of frequencies over which the message may be transmitted,
the terminal device comprises a number, M, of message buffers, each message buffer having a size sufficient to store data associated with one message,
a first candidate is associated with a first repetition level,
a second candidate is associated with a second repetition level that is higher than the first repetition level,
the first candidate and the second candidate are associated with radio resources that overlap in a frequency domain and are arranged in the search space grid to start at a same time, and
an arrangement of candidates defining the search space within the search space grid for the terminal device is selected according to the number M of message buffers for the terminal device and the number N of repetition levels.

2. The wireless telecommunications system of claim 1, wherein the number M of message buffers is less than the number N of repetition levels.

3. The wireless telecommunications system of claim 1, wherein candidates associated with a number, N-M, of the N repetition levels are arranged in the search space grid to start at a same time as at least one other candidate having a higher repetition level and associated with radio resources which overlap in a frequency domain.

4. The wireless telecommunications system of claim 1, wherein candidates associated with at least one of the N repetition levels are arranged in the search space grid so as to not start at times which do not correspond with a start time for at least one oilier candidate having a higher repetition level and associated with radio resources which overlap in a frequency domain.

5. The wireless telecommunications system of claim 1, wherein if the message is transmitted on radio resources associated with a candidate having a repetition level which is lower than a particular repetition level in the search space, the network infrastructure equipment is configured to transmit a further message using a further search space that is initiated before an end of a preceding search space.

6. The wireless telecommunications system of claim 5, wherein an extent of the further search space in a time domain is limited to the time remaining in the preceding search space at a time the further search space is initiated.

7. The wireless telecommunications system of claim 1, wherein the terminal device is configured to allocate one of the M message buffers to operate on an accumulation and flushing cycle having a period that corresponds to a duration spanning the number of repetitions for a particular repetition level.

8. The wireless telecommunications system of claim 7, wherein the terminal device is configured to not allocate a message buffer to operate on an accumulation and flushing cycle that matches a time period spanning the number of repetitions for a second particular repetition level.

9. The wireless telecommunications system of claim 1, wherein the terminal device is configured to flush a message buffer before an end of its accumulation and flushing cycle if a message is successfully decoded from radio resources associated with one of the candidates for the search space and to start another accumulation and flushing cycle before an end of the search space.

10. The wireless telecommunications system of claim 1, wherein the terminal device is configured to convey an indication of the number of message buffers M to the network infrastructure equipment.

11. The wireless telecommunications system of claim 1, wherein the downlink channel comprises a downlink control channel.

12. The wireless telecommunications system of claim 1, wherein the message comprises a control message.

13. The wireless telecommunications system of claim 12, wherein the control message conveys downlink control information comprising an indication of an allocation of radio resources to be used for communicating data between the network infrastructure equipment and the terminal device on another channel supported by the radio interface.

14. The wireless telecommunications system of claim 1, wherein the network infrastructure equipment comprises a base station.

15. The wireless telecommunications system of claim 1, wherein the terminal device comprises a machine-type communication, MTC, device.

16. The wireless telecommunications system of claim 1, wherein the radio resources comprising the search space grid are contiguous in time or frequency.

17. A terminal device for use in a wireless telecommunications system including network infrastructure equipment, the terminal device comprising:
a transceiver;
a number, M, of message buffers; and
processing circuitry to
control the transceiver to communicate with the network infrastructure equipment over a radio interface that supports a downlink channel for conveying a message from the network infrastructure equipment to the terminal device; and
attempt to decode the message, wherein
the message is selectively transmitted by the network infrastructure equipment with a number of repetitions,
the message is transmitted on radio resources selected by the network infrastructure equipment from a plurality of candidates for radio resources that define a search space for the terminal device to search for the message,
the plurality of candidates comprise candidates associated with a number, N, of different repetition levels for the transmission of the message,
the different repetition levels correspond with different numbers of repetitions for the transmission of the message,
the candidates that define the search space are arranged within a search space grid of radio resources extending in frequency and time, and an extension in frequency is sufficient to span a range of frequencies over which the message may be transmitted,
each message buffer of the number M of message buffers has a size sufficient to store data associated with one message,
a first candidate is associated with a first repetition level,
a second candidate is associated with a second repetition level that is higher than the first repetition level,
the first candidate and the second candidate are associated with radio resources that overlap in a frequency domain and are arranged in the search space grid to start at a same time, and
an arrangement of candidates defining the search space within the search space grid for the terminal device is selected in dependence on the number M of message buffers for the terminal device and the number N of repetition levels, and
the processing circuitry attempts to decode the message on radio resources associated with the different candidates of the search space.

18. A method of operating a terminal device in a wireless telecommunications system that includes a network infrastructure equipment, the method comprising:
controlling the terminal device to communicate with the network infrastructure equipment over a radio interface that supports a downlink channel for conveying a message from the network infrastructure equipment to the terminal device; and
attempting to decode the message, wherein
the message is selectively transmitted by the network infrastructure equipment with a number of repetitions,
the message is transmitted on radio resources selected by the network infrastructure equipment from a plurality of candidates for radio resources that define a search space for the terminal device to search for the message,
the plurality of candidates comprise candidates associated with a number, N, of different repetition levels for the transmission of the message,
the different repetition levels correspond with different numbers of repetitions for the transmission of the message,
the candidates that define the search space are arranged within a search space grid of radio resources extending in frequency and time, and an extension in frequency is sufficient to span a range of frequencies over which the message may be transmitted,
each message buffer of a number M of the terminal device's message buffers has a size sufficient to store data associated with one message,
a first candidate is associated with a first repetition level,
a second candidate is associated with a second repetition level that is higher than the first repetition level,
the first candidate and the second candidate are associated with radio resources that overlap in a frequency domain and are arranged in the search space grid to start at a same time, and
an arrangement of candidates defining the search space within the search space grid for the terminal device is selected in dependence on the number M of message buffers for the terminal device and the number N of repetition levels, and
the attempting to decode the message is performed on radio resources associated with the different candidates of the search space.

* * * * *